United States Patent [19]
von Allwoerdan

[11] Patent Number: 5,271,213
[45] Date of Patent: Dec. 21, 1993

[54] TINE FOR HARVESTER

[75] Inventor: Wilhelm von Allwoerdan, Gailingen, Fed. Rep. of Germany

[73] Assignee: Kloeckner-Humboldt-Deutz AG, Fed. Rep. of Germany

[21] Appl. No.: 854,239

[22] Filed: Mar. 20, 1992

[30] Foreign Application Priority Data

Mar. 22, 1991 [DE] Fed. Rep. of Germany ....... 4109451

[51] Int. Cl.⁵ .......................................... A01D 78/00
[52] U.S. Cl. .................... 56/400; 56/400.21; 460/122
[58] Field of Search .............. 56/400, 400.21; 460/121, 122

[56] References Cited

U.S. PATENT DOCUMENTS

| | | | |
|---|---|---|---|
| 3,698,172 | 10/1972 | Johnston | 56/400 |
| 4,706,448 | 11/1987 | Gessel et al. | 56/400 |
| 4,882,899 | 11/1989 | Jasper et al. | 56/400 X |
| 4,901,511 | 2/1990 | Yarmashev et al. | 56/400 X |

*Primary Examiner*—Terry Lee Melius
*Attorney, Agent, or Firm*—Hill, Steadman & Simpson

[57] ABSTRACT

A tine for agricultural harvesters such as supported on a rotating component for conveying stalks with the tine being a one piece structure having a leg or tine portion and a supporting base or eyelet portion, the tine receives a lateral load from one side and the eyelet is slotted at the opposite side with an enlargement at the slot accommodating the passage of a bolt extending radially to attach to a support, a semi-cylindrical boss extending axially on the projection at the side of the leg and extending into a semi-circular recess and held therein by the bolt for providing support for the tine unit.

10 Claims, 1 Drawing Sheet

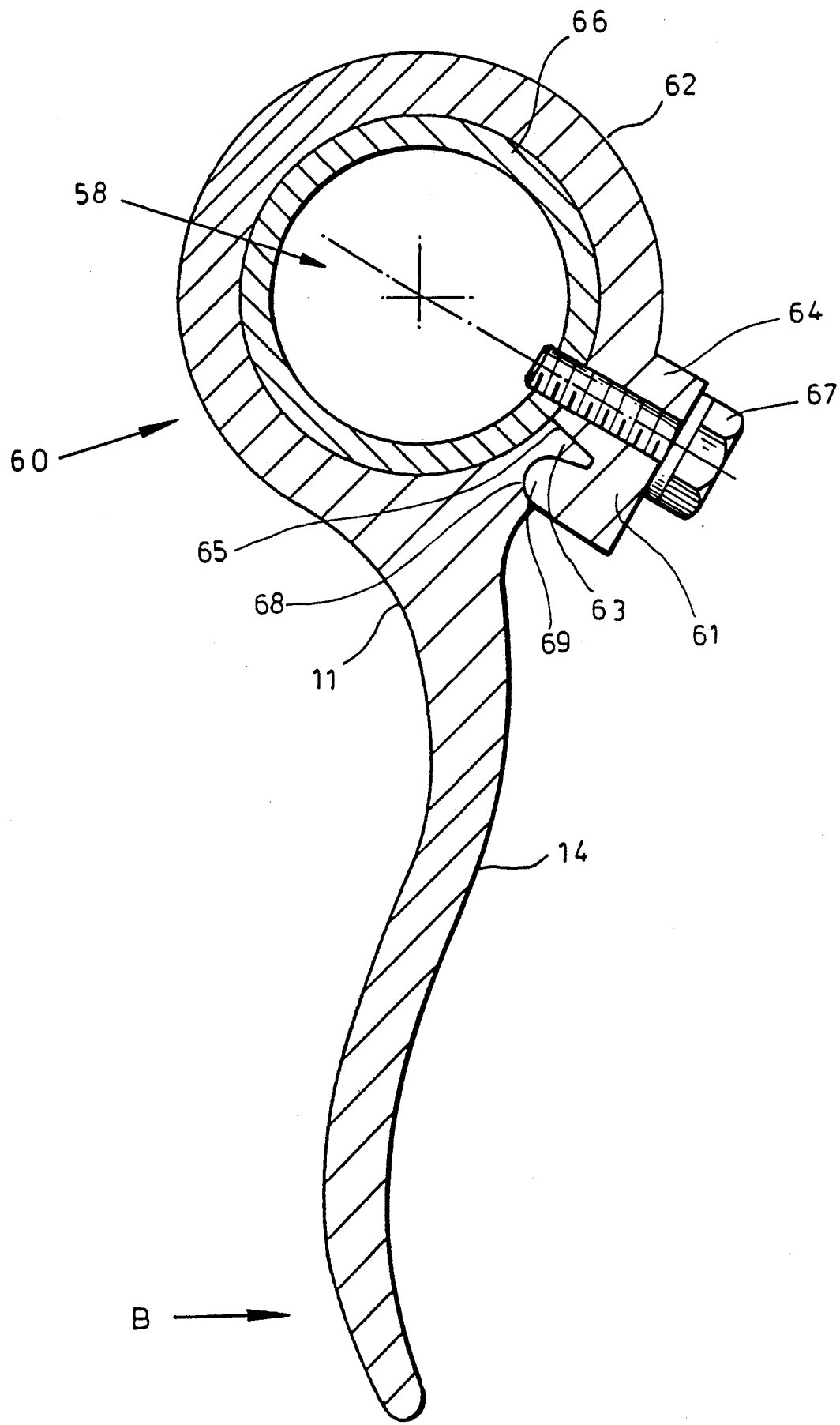

TINE FOR HARVESTER

BACKGROUND OF THE INVENTION

The invention relates to improvement in tine constructions of the type used for agricultural harvesters.

More particularly, the invention pertains to an improved tine and support therefor for mounting on a shaft such as where the tine is part of a rotating part for conveying stalks and the like for agricultural harvesters.

In this type of device, relatively heavy lateral loads must be encountered by a projecting tine and a mount and support for the tine is required which will fix its position on a rotary shaft without providing for excessive weight and bulk. It is also necessary that the tine retain its rotational alignment with the supporting shaft and be readily easy to change in the event of breakage. Often a number of tines are utilized in a single machine so that the strength of each tine must be sufficient so that breakage of individual tines will not require shutting down the machine for replacement.

The tine construction employs an eyelet which enables mounting on a rotatable support shaft. The tine extends radially and may be shaped for optimum performance in the agricultural machine.

With such a tine, a load transmission over the full circumferential area of the support on the support shaft will provide for the most reliable means of carrying the tine.

It is, therefore, an object of the present invention to provide an improved tine structure incorporating a unique support arrangement wherein the lateral load on the tine is transferred by an improved arrangement to the eyelet support by which the tine is carried on a shaft.

A still further object of the invention is to provide an improved tine structure wherein the lateral load on the tine is absorbed and supported by the base which is in the form of a supporting eyelet in an improved manner so that stress transfer provides for a more reliable structure insuring against breakage and insuring against twisting out of orientation on the support shaft.

FEATURES OF THE INVENTION

The design of the invention provides for a useful necking of an eyelet supporting a tine along with a desirable frictional engagement whereby the eyelet is mounted on a supporting cylindrical shaft. This is established by providing a long eyelet section with a supporting arrangement. The design result is that the shearing forces that act on the component are utilized to prevent turning and are advantageously reduced. With an extreme load or sudden interruption of the load on the tine which is accompanied by a sudden recoil of the tine shaft, this in structures hereto available can lead to an undesirable local lift-off of an eyelet section together with the creation of noise and can lead to breakage of the eyelet section. The particular design is very strong for one load direction but will accommodate reversals in stress.

The objects of the invention are achieved in providing an eyelet section that is joined in a unique interlocking fashion with a built-in structure of the tine. This includes an eyelet slot wherein the structure of the tine covers the slot and obtains a retaining function between the longer eyelet section and the shorter eyelet section. As a result with a tine loading opposite the standard load application as well as a sudden recoil of the tine shaft which occurs with an extreme load in the principal stressing direction, the majority part of the applied load is absorbed by the base end of the tine due to the interlocking connection between the two eyelet sections. This tine design improves the fatigue strength and broadens the employment of the inventive tine for alternating stresses in agricultural harvesters wherein an unidirectional load stressing does not exclusively occur.

In accordance with the structure of the invention, a long eyelet section which is provided completely surrounds the cylindrical supporting member and has an end region of the eyelet section extending up to a shorter butt eyelet end. The interruption in the circumferential eyelet which provides for the longer section and the shorter section is at a side lying opposite the direction of the lateral stress on the tine. The tine is rotationally fixed on the shaft with a screw type connection which coacts with the interlocking connection of the eyelet sections and which coacts with an overlap of the shorter eyelet section by the longer eyelet section.

At the long eyelet section is a projection with its free end overlying the shorter eyelet section. The longer eyelet section has a projection which extends radially inwardly and projects into a recess on the shorter eyelet section. This encloses the support around the circumferential shaft and provides an interlocking connection between the two eyelet sections. The boss on the longer eyelet section provides a male member which is directed toward the supporting shaft and extends over the axial width of the eyelet section. The male boss is semicylindrical in shape and corresponds with a semi-cylindrical shaped recess in the short eyelet section. Due to the immediate proximity of the interlocking connection between the two eyelet sections for positionally fixing the tine, a release of this connection between the two eyelet sections is prevented with loading stress on the tine.

The arrangement presents an interlocking connection between the two eyelet sections which does not have a weakening or deleterious effect on the strength of the tine. This is particularly true relative to the butt end of the tine which tine projects outwardly to encounter a cantilever load. The recess on the male member is provided with rounded interfitting surfaces in order to avoid stress peaks. The seating surfaces of the male boss and its recess contact one another and provide a wedge effect when tightening the positional fixing of the tine.

The rounded boss which projects into the recess locks a finger projection at one side of the recess. The arrangement plus the semi-cylindrical cross-sectional shape of the boss and the recess provide for strength of the support and also help lock the eyelet portion over the cylindrical support shaft.

The radial bolt that extends into the large section on the eyelet not only fixes the rotational position of the tine but pulls the overhanging portion tightly to the shorter eyelet portion. Instead of a bolt head, an Allen screw can be utilized to avoid a projection which can catch materials being handled.

In order to retain the desired elasticity of the tine, the positional fixing of the tine is located on the side opposite the location where the load is encountered.

Other objects, advantages and features will become more apparent with the teaching of the principles of the present invention in connection with the disclosure of the preferred embodiment thereof in the specification, claims and drawings in which:

DESCRIPTION OF THE DRAWING

The single FIGURE of the drawing is a radial section taken through the axis of a tine and its support shaft constructed and operating in accordance with the principles of the present invention.

DESCRIPTION OF THE PREFERRED EMBODIMENTS

As shown on the drawing, a tine 60 is positionally and torsionally fixed on a rotary support shaft 66. The structure is such that the tine is locked to the shaft and held in position by a radial bolt 67 which not only locates the rotational position of the tine but functions to draw the parts together which are constructed so that they pull tightly circumferentially around the support shaft 66.

The tine 60 is preferably constructed of integrally one piece and has a leg portion 14 with an eyelet section 62. The eyelet section has a longer portion 64 which extends from the base 11 or butt end of the tine around to a gap or slot 65. The slot divides the eyelet into the longer portion 64 and the shorter portion 63. An enlargement or overhanging portion 61 is at the end of the longer portion 64 and is uniquely shaped to provide for stress sustaining locking inter-relationship between the longer section 64 of the eyelet and the shorter section 63. The longer section embraces the shaft 66 over an angle of nearly 300° and its free end 64 overlaps the shorter eyelet section 63.

At the end of the enlargement or projection 61, is a boss 69 which is received in a recess 68 in the shorter eyelet section. The recess 68 is so shaped that a short eyelet projection 63 extends into a notch in the projection 61 to interlock positively therein when a bolt 67 is tightened. The bolt 67 projects into a radial opening in the projection 61 and is threaded into a threaded recess in the support shaft 66.

The boss 69 and its mating recess 68 form an interlocking connection of the eyelet sections 64 and 63. The end of the short eyelet section 63 forms an obliquely extending seating surface where the two eyelet sections interact and contract in circumferential length when the bolt 67 is tightened.

In order to achieve a high fatigue strength, the recess 68 is fashioned rounded and the male boss 69 is fashioned correspondingly therewith to avoid stress peaks. In a preferred arrangement, the shapes of the recess and the boss are semi-cylindrical.

For utilizing and intensifying the interlocking connection between the two eyelet sections 64 and 63, the bore for the bolt 67 is provided in the projection or enlargement 61 immediately adjacent the eyelet slot 65. In order to achieve a desired elasticity of the tine over a broad region that can proceed from the base end 11 in the eyelet section, the bolt 67 is positioned opposite the principal load direction B on the tine 60. This load direction B is laterally applied and provides a strong rotational force on the eyelet section with the cantilever load encountered.

The interlocking connection between the two eyelet sections 64 and 63 allows for a stressing of the tine in a direction opposite the principal stressing load B. The structure also allows that the tine be manufactured of plastic as well as of steel.

In utilization, an operator slides the eyelet portion 62 over a support shaft 66. At the correct rotational and axial location on the support shaft, the bolt 67 is inserted and tightened which results in the boss 69 being pressed firmly into the recess 68 and the projection 63 on the short eyelet section forcing its way tightly into the end of the enlargement 61. The tightening of the bolt causes a coaction between the ends of the long eyelet section and the short eyelet section such that the tine is firmly locked on the shaft. Further, in operation of the tine, as loads are encountered in the direction indicated at B, the cantilever forces encountered by the tine will force the boss 69 more tightly into the recess 68 and this combination of surfaces will withstand substantial lateral stress on the leg end of the tine. With the simplified unique structure provided between the end of the long eyelet section and the short eyelet section, the parts coact to allow minuscule movement between the parts and such movement will in essence provide a strengthening resistance to shifting of the tine or bending or damage to the tine. In other words, the parts provide their own strength and resistance against breakage of the mount for the tine which is the two sections of the eyelet. As will be observed by the finger projection 63 the lateral force B on the tine will actually cause a camming relationship to occur with the sloping surface at one edge of the finger projection tending to pull the eyelet more tightly around the supporting shaft 66. In other words, both the tightening of the bolt 67, and the forces on the tine, will tighten the eyelet around the shaft. The boss 69 and the camming edge between the boss 69 and the finger projection 63, which is part of the recess 68, actually strengthen the unit or cause a firmer connection between the eyelet and the shaft when cantilever loads are encountered by the tine in the direction B.

Thus, it will be seen that there has been provided an improved tine mounting and tine for agricultural machinery which provides advantages and achieves objectives set forth above.

I claim as my invention:

1. A tine structure for agricultural harvesters such as for rotating parts for conveying stalks, comprising in combination:

a unitary tine structure having a radially extending leg portion at one end and having a support eyelet portion at the other end;

said leg portion adapted to engage a lateral load at a first side of the leg portion;

said eyelet portion having an inner cylindrical surface for mounting on a supporting shaft;

said eyelet portion having a slot at a side opposite said first side of the tine with said slot dividing the eyelet into a long eyelet portion and a shorter eyelet portion;

a bridging projection on a free end of said long portion having a radially projecting boss;

and a recess on the shorter portion positioned to receive the boss in an installed condition of the tine for transferring load stresses occurring to the leg to the supporting shaft and for locking the eyelet portion onto the shaft to support the tine.

2. A tine structure for agricultural harvesters such as for rotating parts for conveying stalks constructed in accordance with claim 1:

wherein said bridging projection is integral with the long portion and extends to overlap the shorter portion.

3. A tine structure for agricultural harvesters such as for rotating parts for conveying stalks constructed in accordance with claim 1:
   wherein said boss extends radially into said recess and has an axial width corresponding to the width of said eyelet portion;
   and means defining a recess in said shorter portion in alignment for receiving said boss.

4. A tine structure for agricultural harvesters such as for rotating parts for conveying stalks constructed in accordance with claim 3:
   wherein said boss and said recess are in surface engagemet.

5. A tine structure for agricultural harvesters such as for rotating parts for conveying stalks constructed in accordance with claim 4:
   wherein said boss has a semi-cylindrical shape and projects into the recess having a semi-cylindrical shape.

6. A tine structure for agricultural harvesters such as for rotating parts for conveying stalks constructed in accordance with claim 1:
   including a cylindrical support member;
   a radially extending opening through said eyelet portion;
   and a bolt extending through said radial opening and threaded into the supporting shaft so that the threads of the bolt are protected from the environment within the supporting member.

7. A tine structure for agricultural harvesters such as for rotating parts for conveying stalks constructed in accordance with claim 6:
   wherein the opening in the eyelet portion is larger than the threaded portion in said supporting shaft;
   and a bolt threaded into the support shaft for aiding in preventing rotation on the tine structure on the support member.

8. A tine structure for agricultural harvesters such as for rotating parts for conveying stalks constructed in accordance with claim 7:
   wherein the bolt extends into the eyelet in a circumferential location opposite said first side of the leg portion.

9. A tine structure for agricultural harvesters such as rotating parts for conveying stalks comprising in combination:
   a one piece tine structure having a radially extending leg with an integral supporting eyelet at the base of the leg;
   said eyelet having a cylindrical inner surface;
   a cylindrical support member extending axially through the eyelet;
   said leg adapted to receive a lateral load at one side in a first direction;
   a separation in said eyelet at a side of the leg opposite said load dividing the eyelet into a long section and a short section;
   said long section having an enlargement projection overhanging the short section;
   a radially extending opening through the projection;
   a bolt extending through said radially extending opening threaded into the support member;
   an overhang portion extending from the long portion to the short portion and having a radial boss with a male curved surface extending axially along the eyelet;
   and a recess in the short eyelet portion being complementary shaped to the boss, said bolt pressing the boss into said recess.

10. A tine structure for agricultural harvester such as rotating parts for conveying stalks comprising in combination:
    a one piece tine structure having a radially extending leg with an integral supporting eyelet at the base of the leg;
    said eyelet having a cylindrical inner surface;
    a split in said eyelet providing a long eyelet portion and a short eyelet portion;
    a bridging part on the long eyelet portion providing a cam surface shaped to tighten the eyelet around a cylindrical support shaft;
    said cam portion shaped so that a lateral force on the extending leg causes the eyelet to tighten around the cylindrical support shaft strengthening the mounting of the eyelet on the shaft as a function of the load on the leg of the tine;
    and a bolt extending radially relative to the cylindrical surface of the eyelet and passing through said supporting eyelet of the tine structure.

* * * * *